3,555,863
CONTROL AND ADJUSTING APPARATUS
Lars Erik Svensson, Tullinge, and Nils Lennart Wahlström, Monsteras, Sweden, assignors to AB Industrifjadrar, Monsteras, Sweden
Filed June 11, 1968, Ser. No. 736,097
Int. Cl. B21f 3/00
U.S. Cl. 72—12    1 Claim

ABSTRACT OF THE DISCLOSURE

A control and adjusting apparatus in spring coiling machines is disposed after the spring coiling means. The apparatus can serve as a sorting device which functions also as an adjusting apparatus for the coiling means by causing, when coming across a faulty spring, a pulse to actuate the coiling means in a sense correcting the fault. The sensing means of the control apparatus operate with both an "external" and an "internal" measuring range, which implies that a pulse for adjusting the coiling means is delivered already when the predetermined "internal" boundary values are exceeded. Even if a lag occurs the coiling means will therefore be adjusted before the fault of the spring reaches a value such that the "external" boundary values involving sorting out of the spring, are exceeded.

---

This invention relates to improved spring spinning or coiling machines having adjustable coiling tools, and a control apparatus disposed after the coiling machine and adapted to sort out the springs whose properties fall outside the boundary values of a predetermined range of tolerances, said control apparatus having associated with it adjusting means which when coming across a spring having an undesired value are adapted to deliver to the coiling tools a pulse correcting the undesired value.

In spring coiling machines where the tension of the spring is produced by bending the spring wire against suitably shaped guide tools, the bias of the finished spring can be altered by adjustment of the relative position of the guide tools. However, by reason of the varying thickness of the spring wire and the gradual wear of the guide tools the pull or compression force properties of the finished springs, once an adjustment has been made, will successively deviate from the desired values. To ensure that the properties of the springs remain within a predetermined range of tolerances it is therefore necessary repeatedly to adjust or set the guide tools. Such adjustment can be realized with the aid of stepwise operating adjusting means. A control apparatus of the type outlined in the foregoing as a rule is constructed as a sorting mechanism which senses the pull and/or compression force of each spring and sorts out the springs whose values fall outside the boundaries of the predetermined range of tolerances.

The novel features of the invention reside in that the means associated with the control and adjusting apparatus are provided with means sensing whether the range of tolerances has been exceeded, and means sensing a small deviation from an ideal value and adapted, already when establishing such a small deviation, to deliver a pulse for adjusting the coiling tools in a sense correcting said small deviation.

For example when variations in the wire thickness occur because several springs as a rule are under conveyance or in various stages of further processing between the coiling tools and the control apparatus, the apparatus according to the invention may, however, sort out springs whose values are very close to the permissible range of tolerances, while the adjusting means move the coiling tools or guide tools stepwise to the correct position. This structural weakness is eliminated by the present invention in that the control apparatus, in addition to the means sensing whether the boundary values of the range of tolerances are exceeded, has associated with it means sensing a small deviation from an ideal value and adapted, already when establishing such a small deviation, to deliver a pulse for adjusting the tools.

Figure 1:
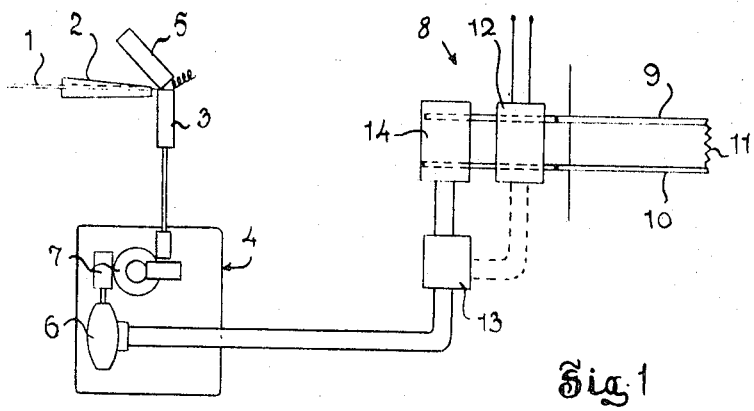
Figure 2:
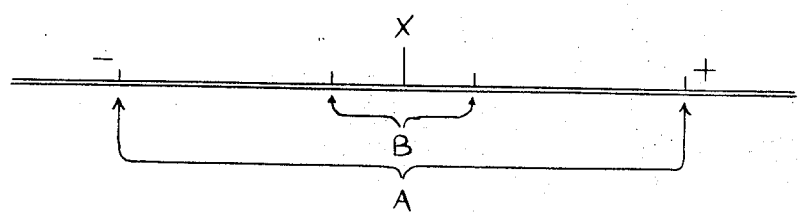

For elucidatory purposes the invention will be more fully described in the following with reference to the accompanying drawing in which:

FIG. 1 in a diagrammatic view shows the construction of a spring coiling machine equipped with a control apparatus;

FIG. 2 shows a comparison between the tolerance ranges providing an adjusting operation and sorting-out operation, respectively.

In the drawing, 1 designates the wire to be coiled, 2 a wire guide, and 3 a guide tool with the aid of which the wire is bent and tension is imparted to it. Associated with the guide tool is an adjusting means 4 which upon actuation moves the guide tool in one or the other direction toward a further guide tool 5 in order to increase or decrease the bias of the coiled spring. The size of the shifting movement of the guide tool amounts to infinitely small values, for which reason the motor 6 comprised in the adjusting means 4 has associated with it one or more toothed-wheel gearings or worm gearings 7 which transmit the movement of the adjusting motor to the guide tool 3. In the embodiment illustrated the sorting apparatus 8 comprises two arms 9 and 10 between which the spring to be controlled 11 is compressed or expanded. The movement of the arms which is braked by resistance means and is proportional to the spring force actuates a sensing means 12 which delivers a pulse for forwarding the spring if the spring tension lies within the permissible tolerance range A (FIG. 2), but delivers a pulse for sorting out the spring if the spring tension falls outside said tolerance range. In the embodiment outlined in the introduction a pulse would be delivered at the same time via the relay means 13 to the adjusting motor 6 responsive to the nature of the fault of the spring so that the motor shifts the guide tool one step in a sense counteracting the fault.

A further means 14 sensing the movement of the arms 9 and 10 is so arranged as to sense the deflections of the arms 9 and 10, caused by the variations of the spring force, within the range of tolerances B lying on either side of the ideal value X of the spring force, said tolerance range B being narrower than the permissible tolerance range A. As soon as a spring shows a value that falls outside the narrow range B there will be produced an adjusting pulse causing the guide tool to shift one step in a sense correcting the imperfect value, and this implies that correction of the position of the guide tool is started already before the imperfect values of the spring have reached a size such that said springs are sorted out.

It has been found that a suitable ratio of the narrow tolerance range B to the permissible tolerance range A is about 1:4.

Of course, the time of the adjusting pulses must be thoroughly synchronized with the advance of the wire past the guide tool. Further, the length of each pulse must be restricted to prevent that an infinitely long pulse occurs in case the machine is stopped precisely at the moment when the pulse is delivered. In order also to prevent that a control operation in which no spring is present between the arms for some reason or other, may give rise to a pulse for correction of too small a spring force there is provided a device which serves to sense whether a spring is in position between the arms. Such a device may comprise two contacts, one for each arm, which permit the passage through the spring of a control current authorizing a measuring or pulse delivering operation.

The invention is not limited to the embodiment described with reference to the drawing but can be modified within the scope of the appended claims.

What we claim and desire to secure by Letters Patent is:

1. An improvement in spring coiling machines having adjustable coiling tools, and a control apparatus disposed after the coiling machine to sort out the springs whose properties fall outside the boundary values of a predetermined range of tolerances, said control apparatus having associated with it adjusting means which when encountering a spring having an undesired value delivers to the coiling tools a pulse correcting the undesired value, characterized in that the means associated with the control and adjusting apparatus are provided with means sensing whether the range of tolerances has been exceeded, and further means sensing a small deviation from an ideal value, to deliver a pulse for adjusting the coiling tools in a sense correcting said small deviation.

References Cited

UNITED STATES PATENTS 3,427,838  2/1969  Rimmer _____ 72—138X
3,433,041  3/1969  Cavagnero et al. _____ 72—138

MILTON S. MEHR, Primary Examiner

U.S. Cl. X.R.

72—135